Jan. 5, 1937.                H. L. NELMS                 2,066,417
                          FISH BONING DEVICE
                         Filed Oct. 12, 1934
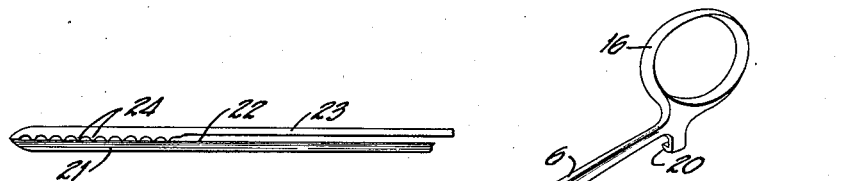
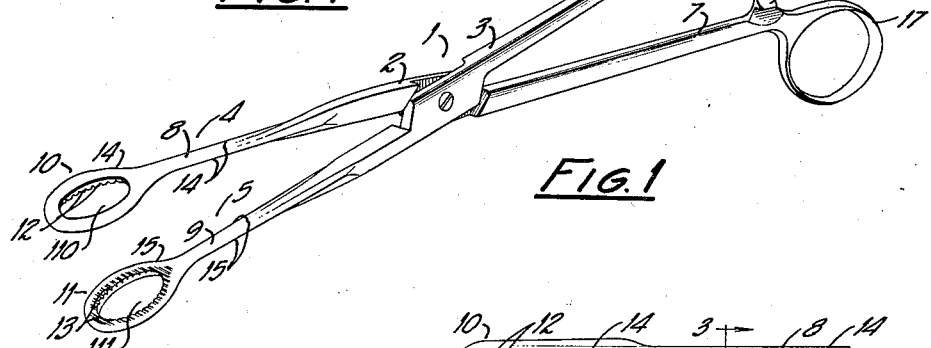
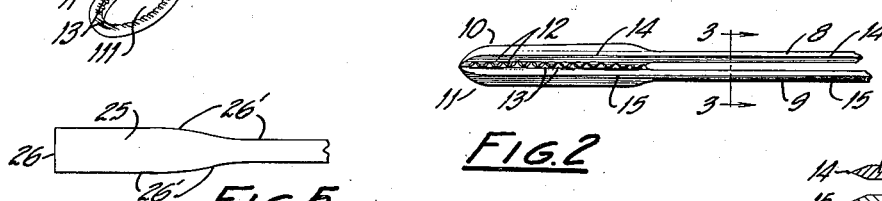
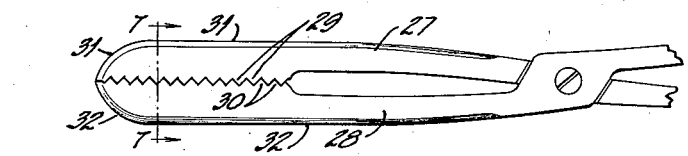
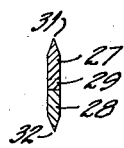
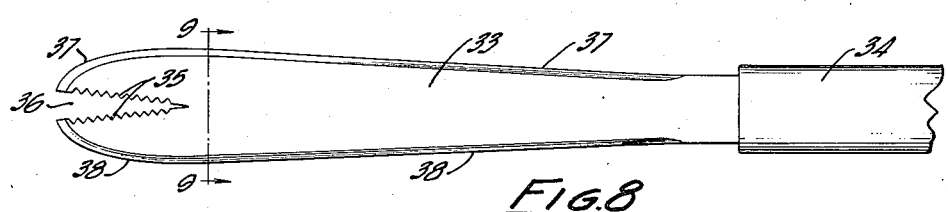
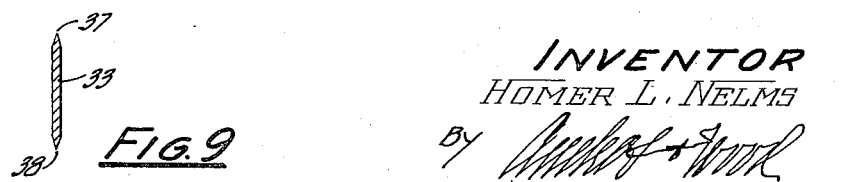
INVENTOR
HOMER L. NELMS
BY
ATTORNEYS Patented Jan. 5, 1937

2,066,417

UNITED STATES PATENT OFFICE 2,066,417

FISH-BONING DEVICE

Homer L. Nelms, Albany, N. Y.

Application October 12, 1934, Serial No. 748,001

13 Claims. (Cl. 17—7)

An object of my invention resides in the provision of a device primarily adapted to cleave and separate the bones from the flesh of a fish after, for example, the head, tail and viscera thereof have been removed in the ordinary manner.

A further object lies in the provision of a tool of the foregoing character which is provided with a cutting edge so disposed that the tool may be moved to cut in substantially all directions without the necessity of withdrawing the same. This, obviously is a very desirable feature of my invention due to the fact that repeated withdrawals and insertions of a cutting tool invariably cause mutilation of the flesh. It is to be understood that, though my device is primarily intended and particularly adapted for use in removing the bony skeleton of a fish, it may be be used for various other purposes.

Further novel features and objects of my invention, appearing in the specification and more particularly pointed out in the claims, will best be understood by reference to the accompanying drawing in which I have illustrated preferred embodiments thereof, and in which—

Fig. 1 is a perspective view of the preferred form of my device;

Fig. 2 is an enlarged, fragmentary detail view of the jaws illustrated in Fig. 1;

Fig. 3 is a section of the jaws taken on the line 3—3 of Fig. 2;

Fig. 4 is a view similar to Fig. 2 illustrating a modified form of jaws;

Fig. 5 illustrates a further modified form of jaw member;

Fig. 6 is a fragmentary view of a modified form of my device;

Fig. 7 is a sectional view taken on the line 7—7 of Fig. 6;

Fig. 8 illustrates a still further modified form of my device; and

Fig. 9 is a sectional view taken on the line 9—9 of Fig. 8.

Like reference characters indicate like parts throughout the drawing.

Referring particularly to Fig. 1, the preferred form of my invention is indicated generally at 1 and comprises two pivotally connected members 2 and 3 having jaws indicated generally at 4 and 5, respecively on one side of the pivotal connection and handles 6 and 7, respectively, on the other side. In the embodiment illustrated, the jaws 4 and 5 are substantially identical in construction and comprise substantially, blade-like, shank portions 8 and 9, respectively, which terminate in somewhat widened end portions 10 and 11. These end portions are preferably provided with gripping means comprising a plurality of protuberances 12 and 13 inwardly disposed to cooperate to engage, for example, the vertebral column of a fish and grip the same firmly therebetween. The jaws 4 and 5 are provided with cutting edges indicated at 14 and 15, respectively, which are disposed entirely around the end portions 10 and 11 and extend a substantial distance longitudinally of the shank portions 8 and 9. It will be noted that in this embodiment of my invention the cutting edges 14 and 15 are directed laterally from the shanks and end portions and extend for a substantial distance on both sides of the shanks. In other words, the cutting edges are directed substantially perpendicularly to the direction of movement of the jaws 4 and 5. It will also be noted that each jaw of my device is provided with cutting edges extending in part transversely and longitudinally on opposed sides thereof. This design provides jaw members which may be manipulated to cut during a forward or lateral movement thereof, whereby the necessity of withdrawing and reinserting the jaw for various operations is eliminated.

In Fig. 1, the portions 10 and 11 are illustrated as provided with centrally disposed openings 110 and 111, respectively. The provision of these openings is not essential; however, the resiliency of the portions 10 and 11 is increased thereby and a more widely distributed gripping surface is provided.

The handles 6 and 7 of my device preferably comprise thumb and finger grips 16 and 17, respectively, though of course, it is to be understood that the handles may be of any useful design. One of the handles, as 7, is preferably provided with a laterally extending projection 18 formed with ratchet teeth 19, while the other handle 6 is provided with a ratchet tooth 20, which is adapted to cooperate with the ratchet teeth 19 of the handle 7. The members 2 and 3 are preferably of steel and are resilient and so designed that the tooth 20 is normally urged toward and in cooperative engagement with the ratchet teeth 19, thus normally preventing the jaws from separating after they are clamped together.

The operation of the embodiment of my invention, described above, when used for removing bones from a fish, is as follows:

The head and tail of the fish are preferably first removed, the ventral surface slitted and the viscera removed in the usual manner, thereby substantially exposing the bony skeleton. The sharpened extremity of either jaw 8 or 9 may be inserted to separate the tissue from the bony skeleton at the anterior end of the vertebral column which, in the embodiment illustrated in Figs. 1 and 2, is gripped between the protuberances 12 and 13. The operator then pulls or pries the bony skeleton from the flesh. In so doing and in order to preserve the flesh in a firm condition free from lacerations, the operator uses the cutting edge of the lower jaw to cleave the adhering muscle tissue from the underside of the bony skeleton. It is evident that, due to the fact that the jaws are provided with peripheries comprising in part laterally directed cutting edges, they may be moved laterally in either direction to cut and sever the muscle tissue so that the bony skeleton may be easily removed from the fish.

Fig. 2 illustrates the portions 10 and 11 urged together in gripping relationship and clearly shows the configuration of each member with the cutting edges extending therearound to form a pincers-like grip at the extremities of the jaw portions. Fig. 3 also serves to illustrate the relative disposition of the cutting edges along the shank portion of the jaws.

It is to be understood that the jaws of my device need not necessarily be identical but may be arranged, for example, as illustrated in Fig. 4 wherein a modified form of jaws is disclosed. In this embodiment, one jaw 21, which may be of any desired shape, is provided at its upper periphery with a cutting edge 22 which preferably extends a substantial distance longitudinally of the jaw. The other jaw 23 is provided with protuberances 24 disposed to cooperate with the jaw 21 to grip, for example, the vertebral column of a fish therebetween.

In Fig. 5, I have illustrated a further modified form of jaw member, indicated at 25, in which a transverse cutting edge 26 is angularly disposed with respect to the longitudinally extending cutting edges 26'. In this embodiment of my invention, the periphery of the jaw comprises more than one cutting edge whereas, in the other embodiment, the periphery comprises, in effect, a single, continuous cutting edge. In any and all events, I desire to provide one or both the jaws of my device with transversely and longitudinally extending cutting edges, the preferred form being illustrated in Fig. 1 in which the single, continuous cutting edge serves as the equivalent of both the cutting edges of the embodiment illustrated in Fig. 5.

In the foregoing, I have described a jaw construction in which the cutting edges are disposed and directed substantially perpendicularly to the direction of movement of the jaw members. In other words, for example, when the device is held and the jaws urged together through an approximately vertical movement thereof, the cutting edges are so disposed that a substantially horizontal movement of the jaws effects a cutting operation. However, a further modified form of my device contemplates the provision of cutting edges disposed in the plane of movement of the jaws and directed outwardly so that a reversal of the gripping movement of the jaws will effect a cutting operation.

Referring particularly to Figs. 6 and 7, the pivotally connected jaw members, indicated at 27 and 28, are provided with gripping means in the form of inwardly directed teeth 29 and 30, respectively. Each of the jaws is provided with respective cutting edges 31 and 32 preferably curving from a point adjacent the toothed portion outwardly and thence extending longitudinally of the jaws for a substantial distance. When the jaws are clamped together, as illustrated, the extremities thereof, which are designed to form a pincers-like grip, abut and the cutting edges form, in effect, a single cutting edge extending entirely around the ends of the clamped jaws and a substantial distance along the shank portions thereof. It will be evident from an examination of Figs. 6 and 7 that the device, in clamped position is comparable to a double-edged blade and is adapted to be used in the same manner as one of the jaws of the device illustrated in Fig. 1. It is to be understood, in connection with the above, that the handle ends of this embodiment of my invention are preferably formed with cooperating ratchet teeth similar to those illustrated in Fig. 1 which serve to hold the jaws in clamped position.

In Fig. 8, I have illustrated a still further modified form of my device wherein a single element 33 is provided which forms a double-edged blade provided with gripping means at one end thereof and a handle 34 at the other. The gripping means, in the embodiment illustrated comprise a plurality of teeth 35 disposed along the converging sides of a reentrant portion 36 and adapted to grasp an object wedged therebetween. The cutting edges 37 and 38 of the element 33 preferably curve outwardly in opposed directions from points on opposite sides and adjacent the reentrant portion 36 and extend a substantial distance longitudinally of said element. It is evident that this embodiment of my device may be used in a manner similar to that in which the jaws of the other embodiments are used. In other words, the element 33 may be inserted beneath and adjacent the vertebral column of a fish and moved sidewise in either direction to sever the adhering muscle tissues and the vertebral column then grasped in the reentrant, toothed portion and teased from the flesh.

It will be noted that the various embodiments and modifications of my invention, hereinbefore set forth, comprise as essential elements, a gripping means and a cutting edged element, the latter element preferably comprising two oppositely directed cutting edges, although, of course, an element provided with a cutting edge extending only on one side thereof may be used. Furthermore, the gripping means may comprise two relatively movable, cooperatively disposed, jaw members, or relatively fixed jaw members. In all the embodiments, however, the gripping means is utilized to grasp, for example, the vertebral column of a fish so that the same may be pulled or pried from the flesh. Likewise, the cutting edges of the jaws, or blade-like elements, although variously disposed with respect to the gripping means in the several modifications thereof, are used to cleave and loosen the flesh from the bones.

It is to be understood that the jaw faces of my device constitute the surfaces of the cooperatively disposed portions adapted to engage and grip, for example, the vertebral column of a fish therebetween and it will be seen that the cutting edges of the members extend about these jaw portions. This construction, of course, permits a member to be inserted, for example, between the flesh and bones of a fish to effect a cutting operation during both a forward and lateral movement thereof.

Furthermore, it is to be understood that, though I have illustrated and described the preferred forms and modifications of my device, I do not wish to be limited to the exact disposition of the elements shown for equivalent structures may be arranged in any desired combinations which are adapted to function in the manner and for the purposes hereinbefore set forth.

While I have described my invention in its preferred embodiments, it is to be understood that the words which I have used are words of description rather than of limitation. Hence, changes within the purview of the appended claims may be made without departing from the true scope and spirit of my invention in its broader aspects.

What I claim is:

1. In a device for removing bones from fish and the like, a pair of relatively movable members having jaw portions provided with cooperatively disposed gripping means and cutting edges; said jaws being movable together cooperatively to form a double-edged, substantially blade-like element.

2. In a device of the character described, two relatively movable, blade-like members having jaw portions at an end thereof, one of said jaw portions being provided with a projection forming a gripping means disposed operatively to engage the other jaw and the edge of one of said members forming an outwardly directed cutting edge extending substantially about the jaw portion thereof.

3. In a device of the character described, two relatively movable, blade-like members having jaw portions forming gripping means at an end thereof, and said blade-like members being provided with cutting edges disposed outwardly and in relatively opposite directions.

4. In a device of the character described, two relatively movable, blade-like members, the first of said members being formed at one end with a jaw portion adapted to cooperate with the second member to form gripping means and the edge of said first member forming a cutting edge extending substantially about said jaw portion.

5. In a device of the character described, two relatively movable members, the end of one of said members forming a jaw portion and the edge of said member forming a cutting edge extending substantially in the plane of the face of said jaw portion and substantially about the same, said cutting edge being adapted to cleave the flesh from the bones of a fish and said members being movable together to grip the vertical column of a fish therebetween.

6. In a device of the character described, two relatively movable, blade-like members, one of said members having a jaw portion provided with a projection disposed operatively to engage the other member and forming gripping means, and the edge of one of said members forming a cutting edge extending substantially about the end thereof.

7. In a device of the character described, a pair of relatively movable, blade-like members having jaw portions, one of said jaws being provided with gripping means adapted to coact with the other jaw and the edges of one of said members forming cutting edges extending longitudinally and on opposite sides thereof; said cutting edges extending substantially in the same plane but in opposite directions.

8. In a device of the character described, a pair of relatively movable, blade-like members formed at one end with jaw portions provided with cooperatively disposed gripping means adapted to grip the vertebral column of a fish therebetween and the edges of said members forming laterally directed cutting edges extending substantially about the jaw portions thereof.

9. In a device of the character described, a pair of relatively movable members forming double cutting edged, blade-like elements having cooperable jaw portions forming gripping means at the ends thereof adapted to grip the vertebral column of a fish; the cutting edges of said members extending longitudinally on both sides and about the jaw ends thereof, whereby said members are adapted to slice and cleave the flesh from the bones of a fish.

10. In a device of the character described, a pair of pivotally connected, blade-like members having handles at one end and jaws at the other, said members being provided with outwardly and oppositely directed cutting edges extending longitudinally thereof and substantially about the jaw ends.

11. In a device of the character described, a pair of pivotally connected, blade-like members having handles at one end and cooperable jaw portions forming gripping means at the other, the opposite edges of said members forming outwardly directed cutting edges extending longitudinally thereof and substantially in the plane of pivotal movement of said members.

12. In a device of the character described, two relatively movable, blade-like members having jaw portions forming gripping means at an end thereof, and the edges of said blade-like members forming a continuous cutting edge extending along the sides and about the end of said jaw portions.

13. In a device of the character described for removing bones from fish and the like, a pair of relatively movable, blade-like members having cooperable jaw portions at the ends thereof; the edges of said members forming cutting edges extending longitudinally thereof and to a point beyond said jaw portions whereby said members are movable together cooperatively to form a blade-like element having a continuous cutting edge extending substantially about the same.

HOMER L. NELMS.

CERTIFICATE OF CORRECTION.

January 5, 1937.

Patent No. 2,066,417.

HOMER L. NELMS.

It is hereby certified that error appears in the printed specification of the above numbered patent requiring correction as follows: Page 3, first column, line 52, claim 5, for the word "vertical" read vertebral; and that the said Letters Patent should be read with this correction therein that the same may conform to the record of the case in the Patent Office.

Signed and sealed this 6th day of April, A. D. 1937.

Henry Van Arsdale
Acting Commissioner of Patents.

(Seal)